(12) United States Patent
Kim

(10) Patent No.: US 6,451,479 B1
(45) Date of Patent: Sep. 17, 2002

(54) CASE OF SECONDARY BATTERY

(75) Inventor: Cheon-soo Kim, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/559,739

(22) Filed: Apr. 28, 2000

(30) Foreign Application Priority Data

May 28, 1999 (KR) .............................................. 99-19452

(51) Int. Cl.$^7$ ................................................ H01M 2/00
(52) U.S. Cl. ........................ 429/163; 429/167; 429/177
(58) Field of Search ................................. 429/163, 167, 429/177

(56) References Cited

U.S. PATENT DOCUMENTS 6,042,704 A * 3/2000 Joshi et al. .................. 204/265
6,245,456 B1 * 6/2001 Fukuda et al. ............... 429/122

* cited by examiner

Primary Examiner—Carol Chaney
Assistant Examiner—Dah-Wei D. Yuan
(74) Attorney, Agent, or Firm—Leydig, Voit & Mayer, Ltd.

(57) ABSTRACT

A case of a secondary battery in which a battery unit having a positive electrode, a separator, and a negative electrode, laminated in sequence, is accommodated. One such case includes a fluorocarbon resin based polymer layer as the innermost layer of the case, a nylon layer as the outermost layer of the case, and an aluminum foil layer between the fluorocarbon resin based polymer layer and the nylon layer.

4 Claims, 3 Drawing Sheets

CASE OF SECONDARY BATTERY

BACKGROUND OF THE INVENTION

1. Field of the Invention

The present invention relates to a secondary battery and, more particularly, to a case of a secondary battery having an improved structure at a portion for sealing a battery unit.

2. Description of the Related Art

Lithium secondary batteries are classified into liquid electrolyte batteries and polymer electrolyte batteries according to the type of electrolyte used. Generally, batteries using liquid electrolyte are called lithium ion batteries and batteries using polymer electrolyte are called lithium polymer batteries.

Among these batteries, lithium polymer batteries use a polymer electrolyte so that they are free of danger of explosion. Also, the lithium polymer batteries have solved the shortcoming of lowering of the battery performance due to byproducts produced during charging or discharging. Further, the lithium polymer batteries are relatively flexible in design shape.

FIGS. 1A and 1B illustrate an example of a conventional lithium polymer battery 10.

As shown in FIG. 1A, the conventional lithium polymer battery 10 includes a battery unit 14 having a plurality of assembled batteries, each battery having a positive electrode 11, a negative electrode 12, and a separator 13 interposed therebetween and laminated. A positive electrode tab 15 is drawn out from one side periphery of the positive electrode 11 and a negative electrode tab 16 is drawn out from one side periphery of the negative electrode 12. The positive and negative electrode tabs 15 and 16 are welded to positive and negative electrode terminals 17 and 18, respectively.

The aforementioned battery unit 14 is mounted in a case 19 having a space in which the battery unit 14 is accommodated. The case 19 includes upper and lower case bodies 19a and 19b which are capable of being separated.

Here, the case 19 has a multi-layered structure.

As shown in FIG. 1B, the case 19 has a structure in which a first poly(ethylene-co-acrylic acid) (EAA) layer 110, a polyethylene (PE) layer 120, a first nylon layer 130, a second EAA layer 140, an aluminum film 150, and a second nylon layer 160 are sequentially laminated.

Here, the above-stated multiple layers function differently. In other words, the first EAA layer 110 and the second EAA layer 140 prevents a swelling effect of an electrolytic solution so that the electrolytic solution does not stick to the aluminum film 150 during the operation of the battery 10. The PE layer 120 enhances the formability of the case 19. The aluminum foil layer 150 prevents moisture from infiltrating into the battery 19 and suppresses the loss of the electrolytic solution. Also, the first and second nylon layers 130 and 160 prevent cracks from being generated in the case 19 and enhance formability.

However, in the case 19 having the aforementioned configuration, since the first and second EAA layers 110 and 140 or the PE layer 120 are not completely insoluble in a small amount of the electrolytic solution injected into the case 19, they may react with the battery 10 during the operation or storage thereof, causing contamination. Also, since the case 19 is weakened by heat, deformation of the battery 10 may be caused due to a raised internal temperature during the operation of the battery 10, deteriorating the battery performance.

SUMMARY OF THE INVENTION

To solve the above problems, it is an object of the present invention to provide a case of a secondary battery having an improved structure for improving the battery performance.

Accordingly, to achieve the above object, there is provided a case of a secondary battery, in which a battery unit having a positive electrode, a separator, and a negative electrode laminated in sequence, is accommodated to then be sealed, the case including a fluorocarbon resin based polymer layer as the innermost layer of the case, a nylon layer as the outermost layer of the case, and an aluminum foil layer between the fluorocarbon resin based polymer layer and the nylon layer.

Preferably, the fluorocarbon resin based polymer layer is a polytetrafluoroethylene (PTFE) layer. Here, the PTFE layer is a single layer of an aqueous emulsion type.

Further, the PTFE layer is preferably a double layer consisting of a first PTFE layer of an aqueous emulsion type, formed as the innermost layer of the case, and a second PTFE layer formed between the first PTFE layer and the aluminum foil layer, for improving adhesion by adding acid and a plasticizer.

A polyethylene terephthalate (PET) layer may be further formed on the nylon layer.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

A case of a secondary battery according to a preferred embodiment of the present invention will now be described in detail with reference to the accompanying drawing.

Figure 1A:
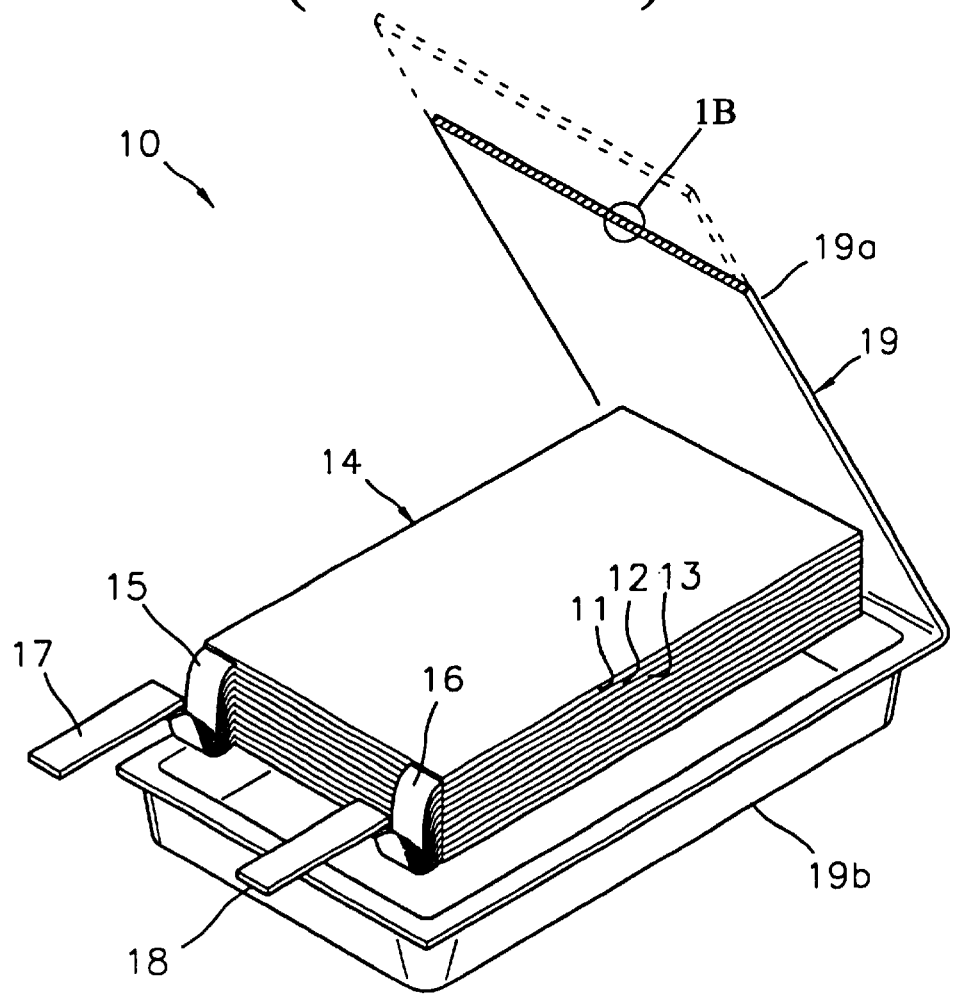
FIGS. 1A and 1B are a perspective view and an exploded view illustrating a conventional secondary battery.
Figure 1B:
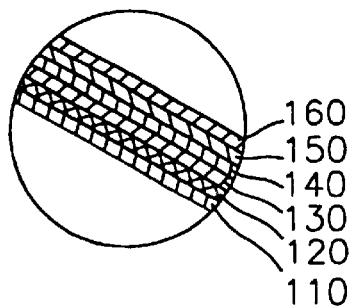
Figure 2A:
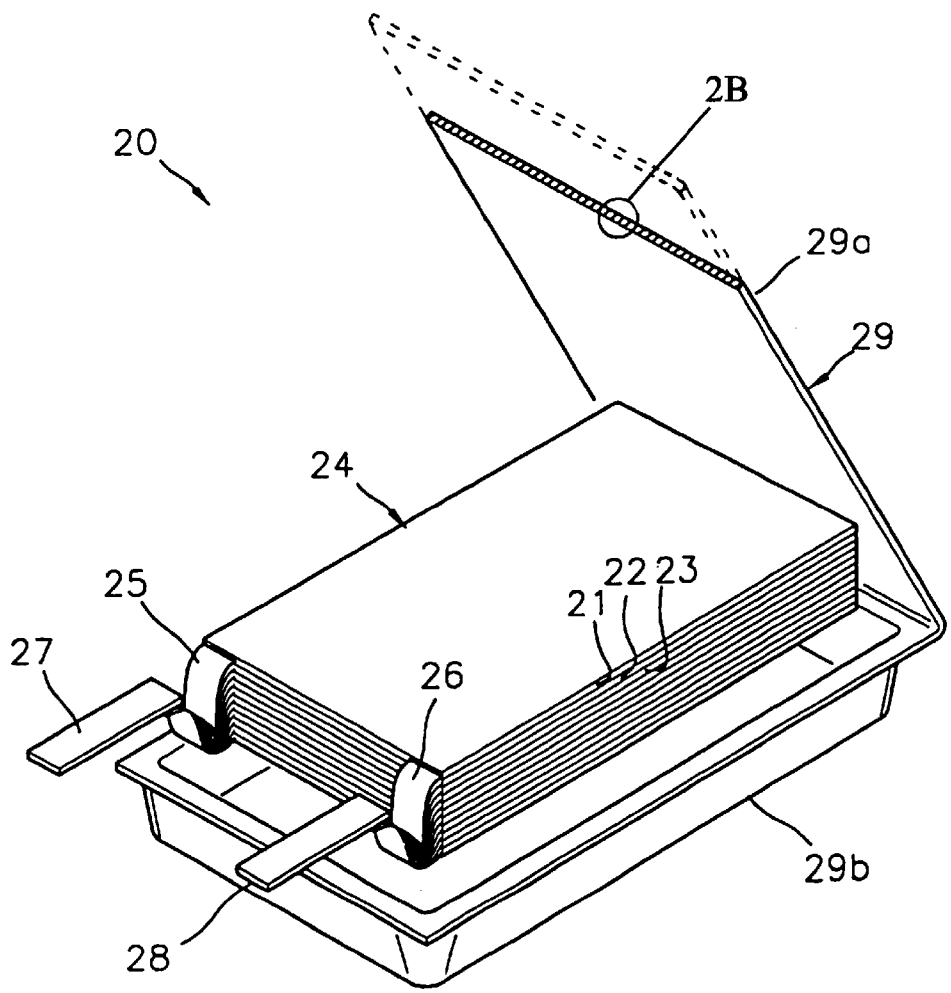
FIGS. 2A and 2B are a perspective view and an exploded view illustrating a secondary battery according to a first embodiment of the present invention.
Figure 2B:
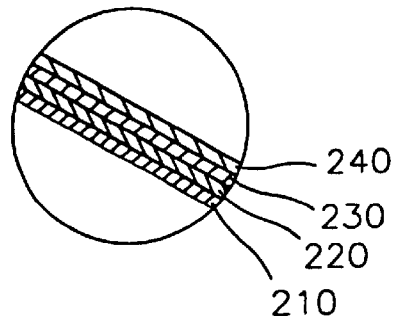

FIGS. 2A and 2B illustrate a secondary battery 20 according to a first embodiment of the present invention.

Referring to FIG. 2A, the secondary battery 20 includes a battery unit 24 having a plurality of assembled batteries laminated sequentially, each of the assembled batteries having a positive electrode 21, a negative electrode 22, and a separator interposed therebetween for insulating the anode from the cathode. The battery unit 24 includes a positive electrode tab 25 and a negative electrode tab 26 drawn out along one peripheral side of each of the positive and negative electrodes 21 and 22. The positive and negative electrode tabs 25 and 26 are welded to a positive electrode terminal 27 and a negative electrode terminal 28, respectively.

The battery unit 24 is accommodated in a case 29 in a state where it is impregnated with an electrolyte. The case 29 has an upper case body 29a and a lower case body 29b welded to each other along each side, at at least one surface thereof, the other side peripheries being capable of being separated.

According to a feature of the present invention, the case 29 has multiple layers having different physical properties, adhered to each other, for protecting the battery unit 24 from the outside shock and easily storing the same.

As shown in FIG. 2B, a fluorocarbon resin based polymer layer is the innermost layer of the case 29. Preferably, a first polytetrafluoroethylene (PTFE) layer 210 is the innermost layer of the case 29. A second PTFE layer 220 is formed on the first PTFE layer 210. An aluminum foil layer 230 is laminated on the second PTFE layer 220. A nylon layer 240 is formed on the aluminum foil layer 230 as the outermost layer.

Here, the above-described multiple layers function differently. The aluminum foil layer 230 maintains an appropriate thickness of the case 29, prevents moisture from infiltrating into the battery from the outside and prevents leakage of the electrolyte.

The nylon layer 240 prevents cracks from being generated on the outer surface of the case 29 and facilitates overall forming.

The second PTFE layer 220 improves a coating capability of the first PTFE layer 210 with respect to the aluminum foil layer 230. In other words, the second PTFE layer 220 allows adhesion by including an acid and a plasticizer in an aqueous emulsion PTFE film applied to the aluminum foil layer 230 and oxidized at the bottom surface of the aluminum foil layer 230 to cause a corrosive reaction.

The first PTFE layer 210 is fixedly adhered to the bottom surface of the second PTFE layer 220.

Here, the first and second PTFE layers 210 and 220 have the largest specific weights among polymer resins, and exhibit chemical resistance and thermal resistance so that they are stable against almost all chemicals and can be used at a temperature of 260° C. for a long time. Also, the first and second PTFE layers 210 and 220 have the smallest specific friction coefficient among solids and are excellent in specific absorbability, that is, absorption ratio or moisture permeability are close to zero permeability resistance and specific viscosity.

The first and second PTFE layers 210 and 220 having excellent physical properties are employed to the case 29, thereby preventing deterioration of the battery.

Figure 3:
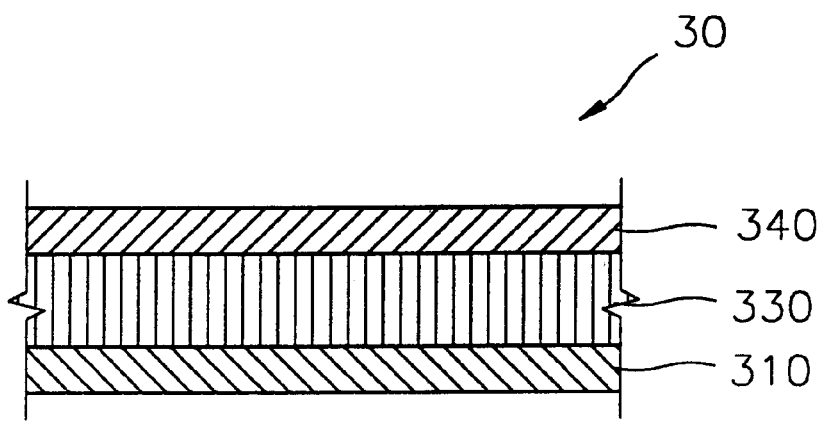
FIG. 3 is a schematic cross-sectional view partially illustrating a case of a secondary battery according to a second embodiment of the present invention.

FIG. 3 is a schematic cross-sectional view partially illustrating a case 30 of a secondary battery according to a second embodiment of the present invention.

Here, only the characteristic parts of this embodiment are described.

Referring to the drawing, the case 30 includes a PTFE layer 310, a single layer, unlike in FIG. 3 in which the PTFE layer has a plurality of layers. In other words, a PTFE layer 310 formed from an aqueous emulsion is the innermost layer of the case 30, and an aluminum foil layer 330 is stacked on the PTFE layer 310. Then, a nylon layer 340 is formed on the aluminum foil layer 330 as the outermost layer of the case 30.

Figure 4:
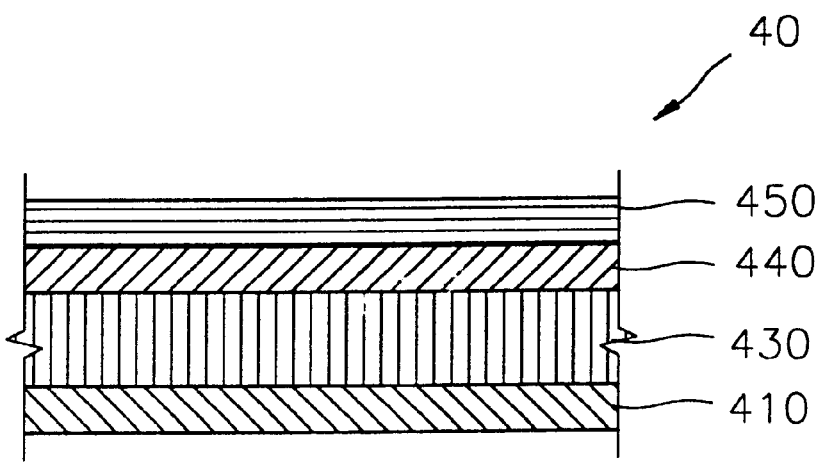
FIG. 4 is a schematic cross-sectional view partially illustrating a case of a secondary battery according to a third embodiment of the present invention.

FIG. 4 is a schematic cross-sectional view partially illustrating a case 40 of a secondary battery according to a third embodiment of the present invention.

Here, only the characteristic parts of this embodiment are described.

Referring to the drawing, the case 40 includes a PTFE layer 410 as the innermost layer of the case 40. The PTFE layer 410 may be a single layer or a double layer, as in FIGS. 2B or 3. An aluminum foil layer 430 is stacked on the PTFE layer 410, and then a nylon layer 440 is formed on the aluminum foil layer 430. Also, a polyethylene terephthalate (PET) layer 450 is further formed on the nylon layer 440 as the outermost layer of the case 40. The PET layer 450 enhances the formability of the case 40. Here, the case 40 may employ only the PET layer 450, without the nylon layer 440. When only the PET layer 450 is formed on the aluminum foil layer 430, the thickness of the aluminum foil layer 430 is preferably 10 to 30 μm. Also, when the nylon layer 440 and the PET layer 450 are sequentially formed on the aluminum foil layer 430, the thicknesses of the respective layers are preferably 10 to 20 μm.

As described above, the case of a secondary battery according to the present invention employs a fluorocarbon resin based polymer layer as an inner layer so that dissolution of an electrolyte injected into the battery does not occur. Thus, the electrolyte is not contaminated. Also, the leakage of the electrolyte is prevented, thereby improving battery safety. Also, the case of a secondary battery according to the present invention employs a nylon layer and a PET layer as outer layers, thereby enhancing the formability of the case.

While the present invention has been described with respect to what is presently considered to be the preferred embodiment, it is to be understood that the disclosed embodiment is provided only for an exemplary embodiment. To the contrary, the present invention is intended to cover various modifications and equivalent arrangements included within the spirit and scope of the appended claims. Accordingly, the true scope and spirit of the invention will be indicated by the following claims.

What is claimed is:

1. A case for a secondary battery, in which a battery unit having a positive electrode, a separator, and a negative electrode, laminated in sequence, is accommodated and sealed, the case comprising:
   a first polytetrafluoroethylene (PTFE) layer as an innermost layer of the case;
   an aluminum foil layer;
   a second PTFE layer interposed between and adhering the first PTFE layer to the aluminum foil layer, the second PTFE layer including an acid and a plasticizer and formed from an aqueous emulsion oxidized to cause a corrosive reaction with the aluminum foil, whereby the first PTFE layer is adhered to the aluminum foil layer; and
   a nylon layer on the aluminum foil layer, opposite the second PTFE layer, as an outermost layer of the case.

2. A case for a secondary battery, in which a battery unit having a positive electrode, a separator, and a negative electrode laminated, in sequence, is accommodated and sealed, the case comprising:
   a polytetrafluoroethylene (PTFE) layer as an innermost layer of the case;
   an aluminum foil layer adhered to the PTFE layer; and
   a polyethylene terephthalate layer as an outermost layer of the case, wherein the PTFE layer consists of a first PTFE film as the innermost layer of the case and a second PTFE film interposed between and adhering the first PTFE film to the aluminum foil layer, the second PTFE film including an acid and a plasticizer and formed from an aqueous emulsion oxidized to cause a corrosive reaction with the aluminum foil, whereby the first PTFE film is adhered to the aluminum foil layer.

3. The case according to claim 2, wherein the aluminum foil layer has a thickness in a range from 10 to 30 microns.

4. The case according to claim 2, including a nylon layer interposed between the aluminum foil layer and the PTFE layer.

* * * * *